United States Patent Office
2,904,463
Patented Sept. 15, 1959

2,904,463

INSECTICIDAL COMPOSITIONS CONTAINING 1-NAPHTHYL-N-METHYLCARBAMATE AND SULFOXIDE AS A SYNERGIST THEREFOR

Herbert H. Moorefield, Ardsley, N.Y., assignor to Union Carbide Corporation, a corporation of New York No Drawing. Application January 20, 1958
Serial No. 709,760

4 Claims. (Cl. 167—32)

This invention relates to insecticidal compositions and is particularly directed to improved insecticidal compositions containing 1-naphthyl-N-methylcarbamate and sulfoxide as a synergist therefor.

1-naphthyl-N-methylcarbamate is a newly discovered broad spectrum insecticide. It is stable in the presence of light and heat and is particularly valuable because of its low mammalian toxicity.

1-naphthyl-N-methylcarbamate (hereinafter referred to as "Sevin," for convenience) may be prepared by reacting a mixture of naphthol, water and sodium hydroxide to form sodium 1-naphthoxide and adding phosgene and toluene to the resulting sodium 1-naphthoxide. The reaction mixture is then agitated, after which the resulting organic phase is separated from the salt solution and distilled to yield 1-naphthyl-chloroformate. Aqueous methylamine is then added to the 1-naphthyl chloroformate. The reaction mixture is then agitated and the precipitate which forms is filtered, washed with water and dried to give crystals of 1-naphthyl-N-methylcarbamate (Sevin).

A specific illustration of the preparation of Sevin is as follows:

N-methylcarbamate was prepared by first preparing sodium 1-naphthoxide by reacting a mixture of 144 parts of 1-naphthol, 400 parts of water and 44 parts of sodium hydroxide at 85° C. for one hour and then cooling to 20° C. A mixture of 96 parts of phosgene and 300 parts of toluene was then added dropwise. After the addition of the phosgene, the reaction mixture was agitated at 25° C. for one hour. The organic phase of the reaction mixture was separated from the salt solution and distilled to give 1-naphthyl chloroformate, which boils at 96° C. to 100° C. at 2 mm. Hg. About 103 parts of 1-naphthyl chloroformate were then slowly added to a mixture of 100 parts of a 39 percent water solution of methylamine and 100 parts of water at 25° C. After the addition of the 1-naphthyl chloroformate, the reaction mixture was agitated at 25° C. for one hour. The solid which separated was filtered, washed with water and dried. The final product, Sevin, was crystalline solid which melted at 142° C. and had the following elemental analysis: carbon 71.2 percent (theory 71.6 percent), hydrogen 5.6 percent (theory 5.5 percent).

Despite the effectiveness of Sevin as an insecticide and despite the advantages it possesses in comparison with the commercially available insecticides, this material is still considerably less than 100 percent effective for many uses when used in the conventional dosage ranges.

I have discovered that Sevin is synergized to an outstanding degree by sulfoxide.

Compositions of Sevin and sulfoxide (N-octyl sulfoxide of isosafrole) result in much greater control of insects than has heretofore been obtained.

The following examples, presented in table form, illustrate the superiority of compositions containing Sevin and sulfoxide and illustrate the outstanding synergistic effect which is obtained by the use of these two materials.

In Table I, which follows, the chemicals were tested in the topical treatment of house flies. In the table, each figure represents the number of micrograms per fly, using an average of two replicates, each containing 25 adult female house flies (*Musca domestica* L.). The compounds contained in 1 microliter of acetone, were applied onto the dorsal thorax of each fly, by means of a micrometer-driven syringe. Mortality counts were made 18 hours after treatment. Sevin and sulfoxide were each separately tested at different dosages and then tested in combination. For comparison, n-propyl isome and sesame extract were also tested in the same manner.

TABLE I

*Tropical treatment of house flies*

| Material tested | Dose (micrograms/fly) | Mortality (percent) after 18 hrs. |
|---|---|---|
| Sevin | 0.5 | 2 |
|  | 0.25 | 0 |
| Sulfoxide | 2.5 | 2 |
| n-Propyl isome | 1.25 | 0 |
| Sesame extract | 1.25 | 2 |
| Sevin plus sulfoxide | 0.5+2.5 | 94 |
| Sevin plus n-propyl isome | 0.25+1.25 | 12 |
| Sevin plus sesame extract | 0.25+1.25 | 6 |

In Table II, which follows, the chemicals were tested using the poison bait test. In the table, each figure represents an average of two replicates containing 25 adult flies (*Musca domestica* L.). The compounds were dissolved in acetone and diluted with an emulsified 10 percent sugar solution. Fifteen milliliters of this solution was added to a cup containing a 1 inch square of an absorbent pad. The flies were restrained with the bait under a 5 inch diameter hemispherical screen cage. Mortality counts were made after 24 hours.

TABLE II

*House fly poison bait tests*

| Material tested | Dose (mg./100 ml. bait) | Mortality (percent) after 24 hrs. |
|---|---|---|
| Sevin | 10 | 28 |
| Sulfoxide | 50 | 0 |
| Sevin plus sulfoxide | 10+50 | 98 |

It can be seen from the preceding data that the combination of Sevin and sulfoxide was outstandingly superior to either Sevin alone or sulfoxide alone and resulted in a much greater effect than would be predicted based on the additive effect of these two materials. The data shows that the synergistic combination of Sevin and sulfoxide may be used in a wide variety of methods of application and is applicable to a wide variety of species, giving substantially uniform and complete control at relatively low dosages. Further, the combination of Sevin and sulfoxide resulted in a very great synergistic effect, whereas the other materials tested gave no such result.

In an additional series of tests, four-day old female flies were topically treated with a micrometer-driven syringe on the dorsal thorax. The doses were each contained in 1 microliter volumes of acetone. Flies were anesthetized with carbon dioxide, treated, held in 125 ml. flasks and supplied with sugar-water. Mortality counts were made after 18 hours. The data obtained, when plotted as log dose, probit mortality, give a flat dosage-mortality curve which breaks in the 70–80 percent mortality range. Thus, Sevin, when used alone, requires a large dose to reflect a small increase in toxicity. The curve for Sevin indicates that complete fly control, exemplified by 100 percent kill, is virtually impossible to attain with Sevin. By comparison, the combination of Sevin with sulfoxide (at a 1:5 ratio) gives in a straight dosage-mortality line which is displaced to the left, showing an increased efficiency in kill. Further, the slope of this line is much steeper than the slope of the Sevin line, indicating a more homogeneous response. For example, a dose of 40 micrograms of Sevin per fly, effected a 70 percent mortality, whereas an equal response was obtained using a mixture of 0.12 microgram of Sevin and 0.6 microgram of sulfoxide.

The exact amount of the synergistic mixture of the present invention which should be employed in insecticidal compositions will be found to vary rather widely and to a certain extent depends upon the ratio of sulfoxide to Sevin, the type of compositions in which the mixture is employed, the method of application, the nature of the insect pests to be controlled, and other factors commonly encountered in the insecticidal art. Concentrations as low as about 0.001 percent by weight may be employed. In general, however, compositions containing from about 0.025 percent to about 10 percent by weight, in either a liquid or solid carrier, give excellent results. For some requirements, stronger concentrations may be desirable up to a maximum of about 20 percent by weight. Liquid carriers which may be employed include water, mineral oils and organic solvents, as well as other solvents or suspending agents. Solid carriers which may be employed include talc, bentonite, diatomaceous earth silica, pyrophyllite, fuller's earth, lime, gypsum, flours derived from cotton seeds and walnut shells, or any other similar powder. The compositions may also contain additives, such as emulsifying agents, wetting agents, binding agents, gases compressed to the liquid stage, odorants, stabilizers and the like. The compositions can be applied as dusts, as liquid sprays or as gas-propelled sprays.

In the synergistic mixture of the present invention, the proportions of the two ingredients may vary from 0.5 to 20 parts by weight of sulfoxide to 1 part of Sevin, but preferably are within the range of from 5 to 10 parts of sulfoxide to one part of Sevin.

The synergistic mixture of the present invention is particularly useful in fly spray compositions. A preferred fly spray composition may contain from about 50 to about 2000 milligrams of Sevin, together with from about 50 to about 4000 milligrams of sulfoxide per 100 milliliters of total composition.

It is frequently the practice in the art to manufacture a composition containing the active ingredients of the formulation in larger amounts than would normally be utilized in a fly spray, such composition being called a "concentrate." Such compositions, or concentrates, are so formulated that by a proper and usually predetermined degree of dilution of the concentrates of a desired class of insecticide may be produced as desired. Concentrates containing the synergistic mixture of my invention may be prepared by the known methods.

As used herein, unless otherwise noted, all parts and percentages are by weight.

I claim:
1. An insecticidal composition comprising 1 part of 1-naphthyl-N-methylcarbamate and, as a synergist therefor, from about 0.5 to about 20 parts of sulfoxide.
2. The method of killing insects which comprises contacting the insects with 1 part of 1-naphthyl-N-methylcarbamate and, as a synergist therefor, from about 0.5 to about 20 parts of sulfoxide.
3. A fly spray composition comprising a solution of 1 part of 1-naphthyl-N-methylcarbamate and, as a synergist therefor, from about 0.5 to about 20 parts of sulfoxide.
4. An insecticidal dust comprising an inert insecticidal adjuvant as a carrier, 1 part of 1-naphthyl-N-methylcarbamate and, as a synergist therefor, from about 0.5 to about 20 parts of sulfoxide.

References Cited in the file of this patent

De Ong: Chem. and Uses of Pesticides, 2nd ed., 1956, Reinhold Pub. Corp., pp. 167 and 239.

Agr. and Food Chem., vol. 5, No. 10, October 1957, p. 721.

Agr. and Food Chem., vol. 5, No. 8, August 1957, p. 557.